Patented Sept. 15, 1936

2,054,062

UNITED STATES PATENT OFFICE 2,054,062

SEED GRAIN DISINFECTANT

Wilhelm Bonrath, Leverkusen-I. G. Werk, and Ewald Urbschat, Cologne-Mulheim, Germany, assignors to Winthrop Chemical Company, Inc., New York, N. Y., a corporation of New York No Drawing. Application December 17, 1935, Serial No. 54,942. In Germany August 1, 1934

5 Claims. (Cl. 167—38)

This invention relates to a fungicidal preparation.

As fungicidal preparations especially for the disinfection of seed grain generally mercury containing compounds have been employed. These mercury containing fungicidal preparations displayed the disadvantage that they often attacked the plants and prevented germination of the seed, even causing poisoning of the persons ha dling the same.

It has therefore been attempted to overcome these disadvantages by using mercury-free fungicidal preparatory. However, all preparations used hitherto were only efficacious against the one or other fungus. There was no fungicidal preparation which could e. g. be used as specific seed grain disinfectant efficacious against all plant diseases which are conveyable by the seed grain.

In accordance with the present invention it has been established that valuable fungicidal preparations and especially seed grain disinfectants can be obtained when using hydroxyphenylhydrazines as the active ingredient.

The term "hydroxyphenylhydrazines" used in the description and in the appended claims is intended to include all phenylhydrazines the benzene nucleus of which is substituted by at least one hydroxyl group. The term is also to include hydroxyphenylhydrazines the benzene nucleus of which is further substituted for example by an alkyl, cycloalkyl, aryl, aralkyl, alkoxy, cycloalkoxy, aryloxy, aralkyloxy, alkoxyalkyl, nitro, cyano, amino and alkylamino, carboxylic acid, carboxylic acid ester, carbonamide, aldehyde, sulfonic acid, sulfonamide, sulfo halogenide, sulfinic acid, arsine oxide group, halogen atoms, or in an ether-like manner to a sulfur and selenium atom, and in which the amino group may be substituted once or twice by an organic radical, for instance, by an acid radical or in which the nitrogen atom of the primary amino group is linked by a double bond to a carbon atom of an organic radical thus forming a hydroxyphenylhydrazone.

The hydroxyl group or groups may be in any position to the hydrazine group. Especially those hydroxyphenylhydrazines have proved to be suitable in which the hydroxyl group or groups are in the para- and/or ortho-position to the hydrazine group.

Suitable compounds of the kind specified are, for instance, 1-hydroxy-2-ethylphenyl-4-hydrazine, 1-hydroxy-3-methyl-phenyl-2-hydrazinesulfonic acid sodium, 1-hydroxy-3-cyclohexylphenyl-4-hydrazine, 1-hydroxy-4-phenyl-phenyl-2-hydrazine, 1-hydroxy-5-naphthyl-phenyl-4-hydrazine oxalate, 2-hydroxy-diphenylmethane-4-hydrazinesulfonic acid sodium, 2-2'-dihydroxy-diphenylmethane-4-hydrazine, 1-hydroxy-3-alkoxy-phenyl-4-hydrazine, 1-hydroxy-3-ethoxy-phenyl-4-hydrazine citrate, 4-hydroxy-2-methoxy-diphenylmethane-3-hydrazine sulfonic acid sodium, 1-hydroxy-2-cyclohexyloxy-phenyl-hydrazine tartrate, 1-hydroxy-2-phenyloxy-phenyl-5-hydrazine, 1-hydroxy-2-benzyloxy-phenyl-5-hydrazinesulfonic acid sodium, 1-hydroxy-2-methoxyethyl-phenyl-4-hydrazine acetic acid, potassium, 2-hydroxy-3-ethoxyethyl-diphenylmethane-4-hydrazine sulfonic acid barium, 4-4'-hydroxy-3-phenoxyethyl-diphenyl-methane-3-hydrazinesulfonic acid sodium, 1-hydroxy-2-nitro-phenyl-4-hydrazine, 1-hydroxy-4-nitro-phenyl-2-hydrazine lactate, 1-hydroxy-2-nitro-5-methoxy-phenyl-4-hydrazinesulfonic acid potassium, 1-hydroxy-3-cyano-phenyl-4-hydrazine, 1-hydroxy-3-cyano-5-methyl-phenyl-4-hydrazine, 2-hydroxy-3-amino-diphenylmethane-4-hydrazinesulfonic acid sodium, salicylic aldehyde-4-hydroxy-3-amino-phenyl-hydrazone, acetone-4-hydroxy-3-carboxylic acid-phenyl-hydrazone, acetophenon-3-amino-4-hydroxy-5-carboxylic acid ethyl ester-phenyl-hydrazone, 1-hydroxy-3-dimethylamino-4-thiosemicarbazide, benzoyl-3-carbonamide-4-hydroxy-phenylhydrazine, thymol-2-carbonamide-4-hydrazinesulfonic acid sodium, 1-hydroxy-3-aldehyde-5-cuminolphenyl-4-hydrazinesulfonic acid sodium, nitrobenzaldehyde-3-sulfonic acid-4-hydroxyphenylhydrazine, benzaldehyde-mercuryacetate-3.5-sulfonic acid sodium-4-hydroxy-phenyl-hydrazine phosphate, cyclohexanone-(3.5-sulfonamide-4-hydroxy-phenyl)-benzoyl-hydrazine, 4-4'-dihydroxy-2-sulfofluoride-diphenylmethane-3-hydrazinesulfonic acid sodium, 1-hydroxy-2.5-disulfofluoride-phenyl-4-hydrazine-sulfate, 1-hydroxy-2-sulfinic acid sodium-phenyl-4-hydrazine, acrolein-2-arsine oxide-4-hydroxy-phenyl-hydrazone, 1-hydroxy-3-chlorophenyl-4-hydrazine sulfonic acid sodium, 1-hydroxy-2.4-bromo-phenyl-3-hydrazine hydrochloride, 4-hydroxy-2-2'-diiodo-diphenyl-methane-3-hydrazine sulfonic acid sodium, 2-hydroxy-4-hydrazine-diphenylsulfide, and 2-hydroxy-4-hydrazine-diphenyl-selenide-phenyl-5-hydrazine.

It has been found particularly advantageous to employ hydroxyphenylhydrazines containing a single hydroxyl group. The hydroxy-phenyl-4-hydrazine sulfonic acid and its salt have proved to be particularly important since they are relatively cheap and highly efficacious as fungicides, especially as seed grain disinfectants.

The hydroxyphenylhydrazines have proved to be efficacious against the most various fungi and particularly against all those causing plant diseases conveyable by the seed grain, for instance fusarium of corn, winged blight of oats, strip disease of barley and stone blight of wheat. On account of their bactericidal and fungicidal properties they may also be used as preservatives, for instance for the preservation of wood, as coatage of ship bottoms and for certain disinfecting purposes.

The hydroxyphenylhydrazines may be applied in the dry or in wet state. For their application in dry state they are preferably mixed with other inert or fungicidal substances, for instance talc, gypsum, wood flour, clay, slate flour. Sodium carbonate, sodium bicarbonate and potassium carbonate may likewise be used as carriers. As fungicides with which the hydroxyphenylhydrazines may be mixed there come into consideration, for instance, arsenic oxide, methylarsine sulfide, methylarsine oxide, phenyl mercury acetate and methoxyethyl mercury chloride.

In order to prevent dusting, often occurring when disinfecting seed grain, dust binding agents such, for instance, as paraffin oil, vaseline, glycerine and also concentrated salt solutions of calcium chloride may be added.

For their application in the wet state the hydroxyphenylhydrazines are dissolved in an aqueous solvent. Particularly the hydrohalides or the sulfuric acid salts of the hydroxyphenylhydrazines and also the alkali metal salts of hydroxyphenylhydrazine sulfonic acids have proved to be suitable for this purpose. For the practical use we prefer a 0.2 to 0.3% aqueous solution of the hydroxyphenylhydrazines, but all those skilled in the art know that these concentrations may be varied within wide limits.

Suitable wetting agents may be admixed with the above described preparations. Such wetting agents are, for instance, soaps and soap like synthetic products such as, for instance, alcohol sulfonates, condensation products of high molecular carboxylic acids with aminocarboxylic acids or hydroxysulfonic acids, certain aromatic sulfonic acids or their condensation products with formaldehyde, reaction products of alkylene oxides and high molecular compounds containing reactive hydrogen atoms, and also condensation products of high molecular fatty acids with polyvalent amines.

Also stabilizing agents which are intended to prevent an eventually occurring oxidation of the hydroxyphenylhydrazines, for instance sodium hydrosulfite and the chlorohydrate of hydroxyl amine may be added.

For better distinguishing the fungicidal preparations obtained in accordance with the present invention, also coloring substances, for instance fuchsin, may be added.

In order to demonstrate the high efficacy of the fungicidal preparations obtained in accordance with the present invention, the result of several comparative tests are indicated hereinafter. The tests are carried out with untreated seed grain and seed grain treated with several preparations containing certain hydroxyphenylhydrazines.

Test I

*1-hydroxy-3-chlorophenyl-4-hydrazine - sulfonic acid sodium*

| | Fusarium | Attack in percent |
|---|---|---|
| 1 | Untreated | 21.6 |
| 2 | 30% of 1-hydroxy-3-chlorophenyl-4-hydrazinesulfonic acid sodium+70% of talc=3:1000 | 0 |

Similar results are obtained when using instead of 1-hydroxy-3-chlorophenyl-4-hydrazine-sulfonic acid sodium the corresponding hydrochloride, phosphate, sulfate, citrate, tartrate, arsenate, phenylarsenate, arsenite. Also 1-hydroxy - 2 - fluoro-3-chloro-4-phenylhydrazine, 1-hydroxy-3-sulfonic acid phenyl-4-hydrazine sulfonic acid sodium and 1-(hydroxy-3-sulfofluoride-phenyl)-4-benzoyl-hydrazine may be employed.

Test II

*Acetone-para-hydroxyphenylhydrazone*

| I | | Fusarium | Attack in percent |
|---|---|---|---|
| | 1 | Untreated | 14.6 |
| | 2 | 30% of acetone-para-hydroxy-phenyl-hydrazone +70% of talc=2:1000 | 0 |
| | 3 | Preparation same as above 3:1000 | 0 |

| II | | Winged blight of oats | |
|---|---|---|---|
| | 1 | Untreated | 30.4 |
| | 2 | Preparation same as above 4:1000 | 0 |

Similar results are obtained when using methylethylketone-para - hydroxyphenylhydrazone, furone-ortho-hydroxy-phenylhydrazone, mesithylene oxide-para-hydroxyphenylhydrazone, cyclohexanone-3-amino-4-hydroxyphenyl - hydrazone, acetaldehyde-para-hydroxyphenylhydrazone, trichloroacetaldehyde - para - hydroxyphenalhydrazone, formaldehyde-ortho-hydroxyphenylhydrazone, propionaldehyde - para - hydroxyphenylhydrazone, crotonaldehyde-para-hydroxyphenylhydrazone, acrolein-para-hydroxyphenylhydrazone, fluoro-propionaldehyde-para - hydroxyphenylhydrazone, nitrobenzaldehyde-meta-hydroxyphenyl-hydrazone, benzaldehyde-arsine oxida-para-hydroxyphenyl-hydrazone, benzaldehyde mercuryacetate-para-hydroxy-phenylhydrazone, hydroxyphenyl - semi - carbazide, hydroxy-phenyl-trio-semi-carbazide and 1-hydroxy-3-sulfofluoride-5-cyano-phenyl-4-thio-semi-carbazide.

Test III

*Salicylicaldehyde-para - hydroxyphenylhydrazone*

| I | | Fusarium | Attack in percent |
|---|---|---|---|
| | 1 | Untreated | 11.3 |
| | 2 | 30% of salicylicaldehyde para-hydroxy-phenyl-hydrazone+70% of talc=2:1000 | 0.6 |
| | 3 | Preparation same as above 3:1000 | 0.2 |

| II | | Winged Blight of Oats | |
|---|---|---|---|
| | 1 | Untreated | 40.1 |
| | 2 | Preparation same as above 4:1000 | 0 |
| | 3 | Preparation same as above 5:1000 | 0 |

Also 2-nitro-5-hydroxybenzaldehyde-para-hydroxyphenylhydrazone-3-fluoro-5-hydroxybenzaldehyde-para-hydroxyphenylhydrazone, 2-carboxylic ethyl ester-5-hydroxy-benzaldehyde-2'-chloro-4'-hydroxyphenylhydrazone have proved to be efficacious.

Test IV

*Benzoyl-para-hydroxyphenylhydrazine*

| I | | Fusarium | Attack in percent |
|---|---|---|---|
| | 1 | Untreated | 14.6 |
| | 2 | 30% of benzoyl - p - hydroxyphenylhydrazine+70% of talc=2:1000 | 0 |
| | 3 | Preparation same as above 3:1000 | 0 |

| II | | Winged blight of oats | |
|---|---|---|---|
| | 1 | Untreated | 30.4 |
| | 2 | Preparation same as above 3:1000 | 1.4 |
| | 3 | Preparation same as above 4:1000 | 0 |

Similar results are obtained when using instead of benzoyl-para-hydroxyphenylhydrazine acetyl-para-hydroxyphenylhydrazine, acetyl-ortho-hydroxy-phenylhydrazine, propionyl-meta-hydroxyphenylhydrazine, phenylacetyl-para-hydroxyphenylhydrazine, naphthoyl-para-hydroxyphenylhydrazine, fluoro-acetyl-para-hydroxyphenylhydrazine, mercury acetate-benzoyl-para-hydroxyphenylhydrazine, 1-(hydroxy-2-arsine oxide phenyl)-4-benzoyl-hydrazine, and (1-hydroxy-2-arsine oxide phenyl)-benzoyl-mercury acetate phenyl-4-hydrazine.

Test V

*Thymol-4-hydrazinesulfonic acid sodium*

| | Fusarium | Attack in in percent |
|---|---|---|
| 1 | Untreated | 10 |
| 2 | 30% of thymol-4-hydrazinesulfonic acid sodium+70% of talc=3:1000 | 0 |

Instead of thymol-4-hydrazinesulfonic acid sodium also cresol-4-hydrazinesulfonic acid sodium, xylenol-4-hydrazinesulfonic acid sodium, cuminol-4-hydrazinesulfonic acid sodium, naphthol-4-hydrazinesulfonic acid sodium, as well as 1.2-dihydroxyphenyl-4-hydrazinesulfonic acid sodium may be employed. Also the corresponding potassium, magnesium, barium, calcium, ammonium and amine salts have proved to be suitable.

Test VI

*2-hydroxydiphenylmethane-4-hydrazine sulfonic acid sodium*

| | Fusarium | Attack in percent |
|---|---|---|
| 1 | Untreated | 10 |
| 2 | 30% of 2-hydroxydiphenylmethanesulfonic acid sodium+70% talc=3:1000 | 0 |

Similar results are obtained when using 2.2'-dihydroxy-diphenylmethane-4-hydrazinesulfonic acid sodium, 2-hydroxy-3-fluoro-diphenylmethane-4-hydrazinesulfonic acid sodium and 2-hydroxy-3-chloro-3'-diphenylmethane-4-hydrazine-sulfonic acid barium.

Test VII

*4-hydroxydiphenylmethane-3-hydrazine sulfonic acid sodium*

| | Fusarium | Attack in percent |
|---|---|---|
| 1 | Untreated | 10 |
| 2 | 30% of 4-hydroxydiphenylmethane-3-hydrazine sulfonic acid sodium, 70% of talc=3:1000 | 0 |

Instead of 4-hydroxydiphenylmethane-3-hydrazine sulfonic acid sodium also 1-hydroxy-2-phenyl-phenyl-4-hydrazine, 2-hydroxy-5-hydrazine-diphenyloxide, 2-hydroxy-5-hydrazine-diphenylsulfide, 2-hydroxy-5-hydrazine-diphenylselenide, 2-hydroxy-4-hydrazine-diphenylsulfon, 2-hydroxy-4-hydrazine-diphenylsulfonoxide and 2-hydroxy-4-hydrazine-4'-phenoxy-diphenyloxide may be used.

Test VIII

*p-Hydroxyphenylhydrazine sulfonic acid potassium*

| | Winged blight of oats | Attack in percent |
|---|---|---|
| 1 | Untreated | 41.8 |
| 2 | Seed grain steeped for 30 minutes in a 0.2% aqueous solution of p-hydroxyphenylhydrazine sulfonic acid potassium | 0 |

Instead of the potassium salt also the sodium or ammonium salt may be used. When using 1-hydroxyphenyl-4-hydrazine hydrochloride or 1-hydroxyphenyl-4-hydrazine sulfate instead of one of the mentioned salts of p-hydroxyphenylhydrazine sulfonic acid, the same result is obtained.

Test IX

*1 - hydroxy-3-chlorphenyl-4-hydrazine sulfonic acid sodium*

| | Winged blight of oats | Attack in percent |
|---|---|---|
| 1 | Untreated | 41.8 |
| 2 | Seed grain steeped for 30 minutes in a 0.2% aqueous solution of 1-hydroxy-3-chlorphenyl-4-hydrazine sulfonic acid sodium | 0 |

The sodium salt can be replaced by the corresponding potassium or ammonium salt. Instead of the 1-hydroxy-3-chlorphenyl-4-hydrazine sulfonic acid sodium also fluoroacetyl - p - hydroxyphenylhydrazine sulfonic acid sodium or 1-hydroxy-3-bromphenyl-4-hydrazine sulfonic acid sodium may be used.

Test X

*1 - hydroxy-2-chlorphenyl-4-hydrazine sulfonic acid sodium*

| | Winged blight of oats | Attack in percent |
|---|---|---|
| 1 | Untreated | 41.8 |
| 2 | Seed grain steeped for 30 minutes in a 0.2% aqueous solution of 1-hydroxy-2-chlorphenyl-4-hydrazine sulfonic acid sodium | 0 |

Instead of the 1-hydroxy-2-chlorphenyl-4-hydrazine sulfonic acid sodium also 1-hydroxy-2.5-dichlorphenyl-4-hydrazine sulfonic acid sodium or 1-hydroxy-2.5-dibromphenyl-4-hydrazine sulfonic acid sodium may be used. The sodium salts

Test XI

*Thymol-4-hydrazine sulfonic acid sodium*

| Winged blight of oats | Attack in percent |
|---|---|
| 1 Untreated | 41.8 |
| 2 Seed grain steeped for 30 minutes in a 0.2% aqueous solution of thymol-4-hydrazine sulfonic acid sodium | 0 |

Instead of thymol-4-hydrazine sulfonic acid sodium also cresol-4-hydrazine sulfonic acid sodium, cuminol-4-hydrazine sulfonic acid sodium, naphthol-4-hydrazine sulfonic acid sodium, and also 1.2-diphdroxyphenyl-4-dydrazine sulfonic acid sodium may be employed. Also the corresponding potassium, ammonium and amine salts have proved to be suitable.

This application is a continuation in part application to our application Ser. No. 33,390 filed July 26, 1935.

We claim:—

1. Fungicidal preparations comprising as an active ingredient a hydroxyphenylhydrazine.

2. Fungicidal preparations comprising as an active ingredient hydroxyphenylhydrazine containing one hydroxyl group in the benzene nucleus.

3. Fungicidal preparations comprising as an active ingredient hydroxyphenylhydrazine containing one hydroxyl group in the para-position to the hydrazine group.

4. Fungicidal preparations comprising as an active ingredient hydroxyphenylhydrazine having a hydroxyl group in the ortho-position to the hydrazine group.

5. Seed grain disinfectant comprising as an active ingredient a salt of 1-hydroxyphenyl-4-hydrazine sulfonic acid.

WILHELM BONRATH.
EWALD URBSCHAT.